(12) United States Patent
Jeong

(10) Patent No.: US 6,272,944 B1
(45) Date of Patent: Aug. 14, 2001

(54) SHIFT LEVER SYSTEM OF AUTOMATIC TRANSMISSION FOR VEHICLE

(75) Inventor: Won-Jin Jeong, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/425,571

(22) Filed: Oct. 20, 1999

(30) Foreign Application Priority Data

Feb. 6, 1999 (KR) .................................................. 99-4062

(51) Int. Cl.[7] .............................. F16H 59/08; F16H 63/38
(52) U.S. Cl. ................................... 74/473.33; 74/473.12; 74/473.28; 74/527
(58) Field of Search ........................ 74/473.12, 473.28, 74/473.32, 473.33, 527

(56) References Cited

U.S. PATENT DOCUMENTS

| | | | |
|---|---|---|---|
| 3,458,018 | * | 7/1969 | Shore .................................. 192/220.1 |
| 3,858,695 | * | 1/1975 | Whisler ........................... 74/483 R X |
| 4,630,499 | * | 12/1986 | Hopkins ............................. 74/473.33 |
| 5,184,523 | * | 2/1993 | Nyzedatny .................... 74/473.33 X |

\* cited by examiner

Primary Examiner—Allan D. Herrmann
(74) Attorney, Agent, or Firm—Christie, Parker & Hale, LLP

(57) ABSTRACT

A shift lever system for a vehicle having longitudinal and lateral directions. The shift lever system includes a shift lever pivotable in the longitudinal and lateral directions, a main range shift part for a shift operation between parking P, reverse R, neutral N, and drive D ranges in accordance with a movement of the shift lever along a first line between a first point and a second point, the line being parallel to the longitudinal direction, a forward manual shift part for a shift operation between third 3, second 2, and lock up L ranges in accordance with a movement of the shift lever along a second line between a third point and a fourth point, the second line being parallel to the first line and the first and third points being located on a third line perpendicular to the longitudinal direction, and the second and fourth points being spaced away from the third line in the same longitudinal direction, and a D-3/3-D range shift part for a shift operation between the D and 3 ranges in accordance with a movement of the shift lever along the third line connecting the first point to the third point.

18 Claims, 5 Drawing Sheets

SHIFT LEVER SYSTEM OF AUTOMATIC TRANSMISSION FOR VEHICLE

BACKGROUND OF THE INVENTION (a) Field of the Invention

The present invention relates to an automatic transmission for a vehicle and, more particularly, to a shift lever system of an automatic transmission for a vehicle.

(b) Description of the Related Art

Generally, an automatic transmission includes seven modes that can be manually controlled by the driver, i.e., a parking (P) range, a reverse (R) range, a neutral (N) range, a drive (D) range, a third speed (3) range, a second speed (2) range 2, and a lock up (L) range. Changes in the mode of the automatic transmission is realized by user manipulation of a shift lever along a linear path S as shown in FIG. 8.

A shift cable is coupled to a lower end of the shift lever pivotally fixed on a transmission housing, and a detent member is provided on a hinge portion of the shift lever to securely maintain the changed mode and allow the driver to feel the changes in the shift modes. Accordingly, when the driver moves the shift lever along the linear path S, the shift cable cooperates to displace a manual valve of the automatic transmission, thereby initiating changes in a hydraulic system to realize shifting into the desired mode.

However, in the conventional shift lever system, the linear motion of the shift lever to change modes is such that the operational stroke of the shift lever from parking (P) range to the lockup (L) range quite lengthy. This results in a range indicating panel, on which shift modes are marked along the linear operational direction of the shift lever, occupying a large amount of space of a center console.

In addition, the lengthy operation stroke of the shift lever may cause the driver's elbow and/or arm to strike the front passenger seat or other objects inside the vehicle when changing the shift mode.

SUMMARY OF THE INVENTION

The present invention has been made in an effort to solve the above problems.

It is an objective of the present invention to provide a shift lever system in which a shift lever can move in longitudinal and lateral directions, thereby reducing an operational length of the shift lever (i.e., the amount of space in a linear direction used by the shift lever).

To achieve the above objective, the present invention provides a shift lever system for a vehicle having longitudinal and lateral directions, the shift lever system comprising a shift lever pivotable in the longitudinal and lateral directions, a main range shift part for a shift operation between parking P, reverse R, neutral N, and drive D ranges in accordance with a movement of the shift lever along a first line between a first point and a second point, the line being parallel to the longitudinal direction, a forward manual shift part for a shift operation between third 3, second 2, and lockup L ranges in accordance with a movement of the shift lever along a second line between a third point and a fourth point, the second line being parallel to the first line and the first and third points being located on a third line perpendicular to the longitudinal direction, and the second and fourth points being spaced away from the third line in the same longitudinal direction, and a D-3/3-D range shift part for a shift operation between the D and 3 ranges in accordance with a movement of the shift lever along the third line connecting the first point to the third point.

The shift lever is pivotally fixed at its lower end to an upper end of a first rotating member by a first hinge pin which is disposed in the longitudinal direction, and a lower end of the first rotating member is pivotally fixed around a main hinge pin disposed in the lateral direction.

The first rotating member comprises a pair of supporting plates, a post fixed between the supporting plates and extending downward, and a hinge tube fixed on a lower end of the post to rotatably receive the main hinge pin, the shift lever being disposed between the supporting plates by the first hinge pin above the post.

The main range shift part comprises a first support rotatably supported at an end of the main hinge pin, and a connecting member selectively coupled to the select lever and connected to a shift cable.

The forward manual range shift part comprises a second support supported at the other end of the main hinge pin and a connecting member selectively coupled to the select lever.

The second support comprises a lower member fixed on the main hinge pin, and an upper member pivotally coupled to the lower member by a hinge pin.

The D-3/3-D range shift part comprises a third speed On/Off switch electronically coupled to the transmission control unit, the third speed On/Off switch being turned on when the shift lever is moved from the D range to the 3range by being contacted with the shift lever.

The shift lever system may further comprise a detent member disposed between the shift lever and the first hinge pin.

The detent member comprises a wave-shaped detent plate inserted into a hinge hole formed on a lower body of the shift lever and a detent projection formed on a central portion of the first hinge pin.

An insertion groove is formed on a wall of the hinge hole to accommodate the detent plate, and a guide groove is formed on the support of the first rotating member so that the detent projection is inserted together with the first hinge pin.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings.

Figure 3:
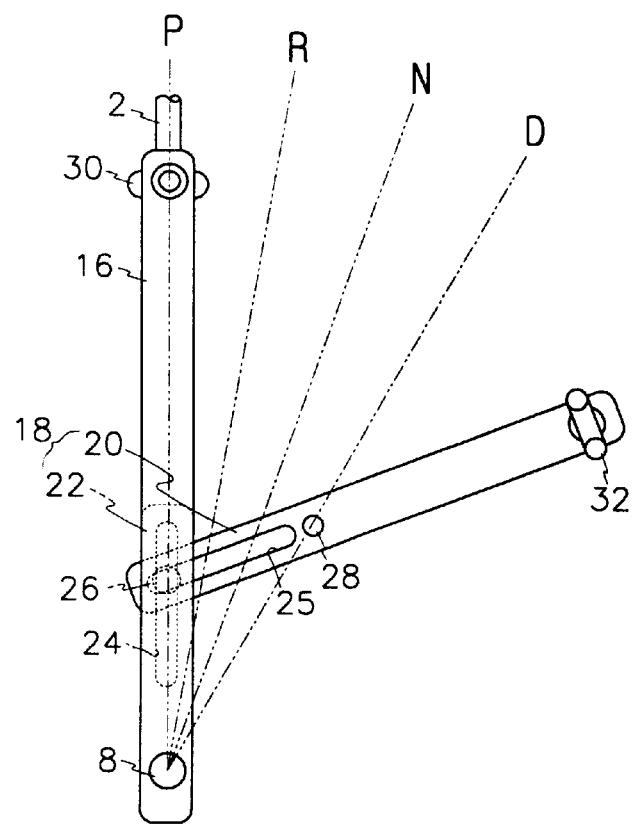
FIG. 3 is a schematic diagram illustrating a shift motion between P, R, N, and D ranges of a shift lever system according to a preferred embodiment of the present invention.

Referring first to FIG. 3, shown is a perspective view illustrating a shift lever system according to a preferred embodiment of the present invention. Reference numeral 2 in the drawing indicates a shift lever.

The shift lever 2 is pivotally fixed at its lower end to an upper end of a first rotating member 4 by a first hinge pin 6 which is disposed in a longitudinal direction with respect to a vehicle body. A lower end of the first rotating member 4 is pivotally fixed around a main hinge pin 8 disposed in a lateral direction with respect to the vehicle body. Accordingly, the shift lever 2 is capable of pivoting in a lateral direction of the vehicle body by the first hinge pin 6 and in a longitudinal direction of the vehicle body by the main hinge pin 8.

The first rotating member 4 includes a pair of supporting plates 14, a post 12 fixed between the supporting plates 14 and extending downward, and a hinge tube 10 fixed on a lower end of the post 12 to rotatably receive the main hinge pin 8. The shift lever 2 is disposed between the supporting plates 14 by the first hinge pin 6 above the post 12.

The main hinge pin 8 is pivotally fixed on a transmission case (not shown) or a shift lever housing (not shown) to function as a support of the shift lever system of the present invention.

A first support 16 for facilitating shifting between automatic shift modes of P, R, N and D ranges is rotatably supported at an end of the main hinge pin 8, and a second support 18 for performing shifting between the automatic modes of 3, 2 and L ranges is supported at the other end of the main hinge pin 8. The second support 18 includes upper and lower members 20 and 22 that are connected to each other. That is, the upper and lower members 20 and 22 are respectively provided with longitudinal slots 24 and 25 at their proximal ends, and a second hinge pin 26 is inserted into the longitudinal slots 24 and 25 to interconnect the upper and lower members 20 and 22. In addition, a middle portion of the upper member 20 is pivotally connected to the transmission housing or shift lever housing by a third hinge pin 28.

When in the P range, the lower member 22 is supported on the main hinge pin 8 in a state parallel with the first support 16 while the upper member 20 maintains a predetermined angle with the lower member 22 as shown in the drawing. However, when the shift lever 2 is shifted into the D range, both the shift lever 2 and the first support 16 come to be in parallel with the upper member 20. That is, when in the D range, an imaginary line passing through a center of the third hinge pin 29 intersects a longitudinal axis of the shift lever 2 and the first support 16. This change in relative positions between the first support 16, shift lever 2 and upper member 20 of the second support 18 occurs gradually as the user shifts from the P range to the D range.

First and second connecting members 30 and 32 are respectively disposed on upper ends of the first support 16 and upper member 20 of the second support 18 to selectively transmit the motion of the shift lever 2 to one of the supports 16 and 18. Each of the first and second connecting members 30 and 32 is designed such that an inner end thereof is branched having a U-shape to enable the shift lever 2 to be inserted into the U-shape portion and slightly movable therein. In addition, an outer end of the first connecting member 30 is connected to a shift cable 34 connected to a manual valve (not shown) of the transmission.

An On/Off switch 36 is provided above the second support 18, the On/Off switch 36 being electrically coupled to a transmission control unit (not shown) to change the drive mode into the third speed 3 range when turned through contact with the shift lever 2.

The operation of the above described shift lever system will be described hereinafter.

Figure 1:
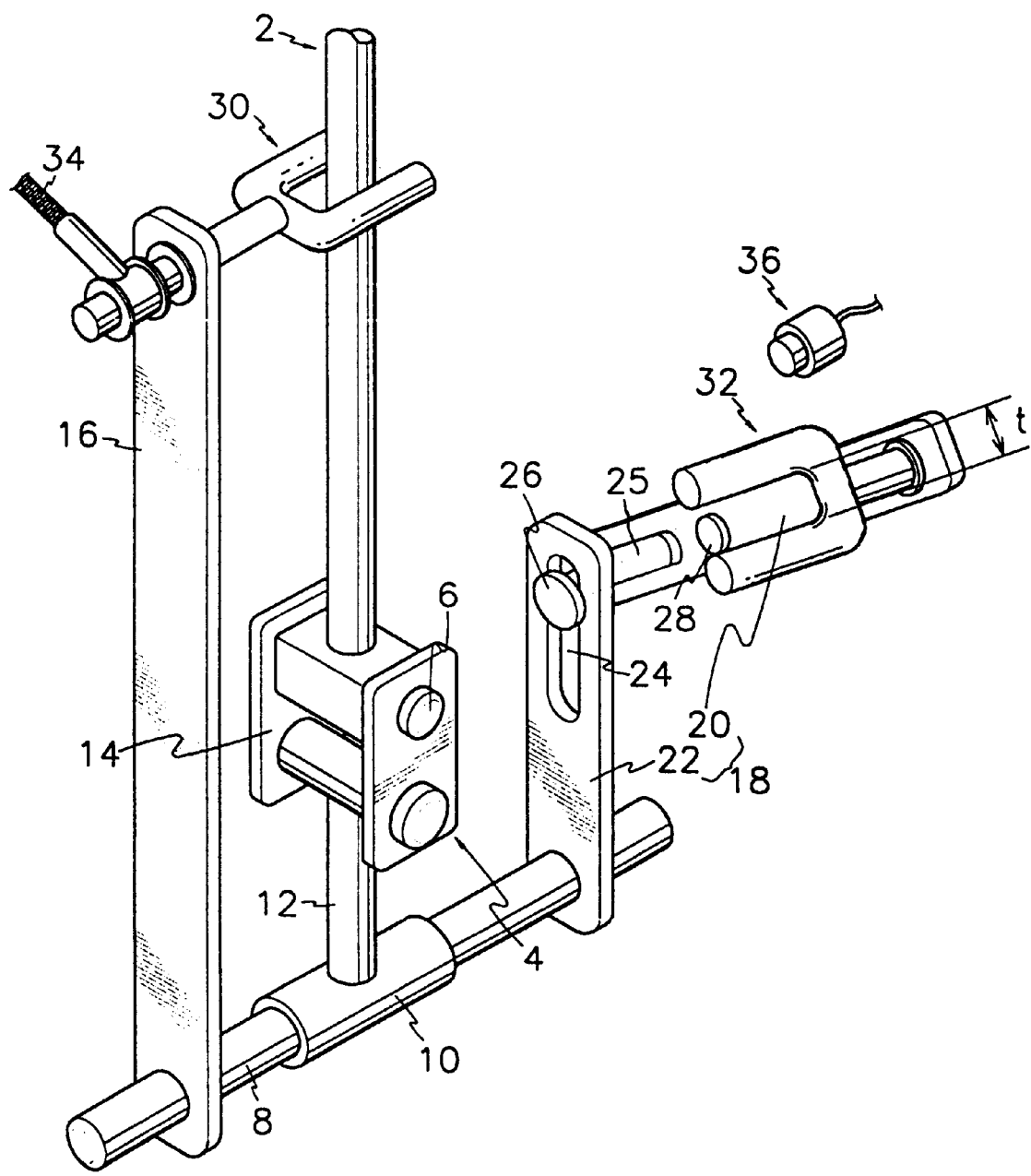
FIG. 1 is a perspective view of a shift lever system according to a preferred embodiment of the present invention.
Figure 2:
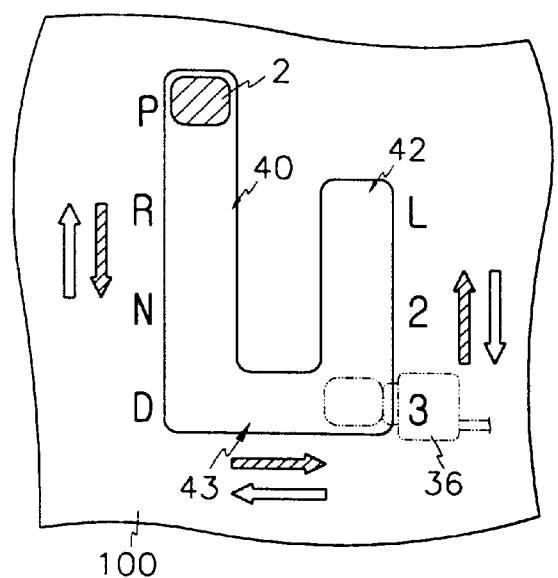
FIG. 2 is a schematic plane view of a range indicating panel for illustrating an operation pattern of a shift lever system according to the present invention.

FIG. 2 shows a range indicating panel of the shift lever housing. The shift lever 2 of the present invention is designed to move along a U-shape shift pattern.

A range indicating panel 100 includes a first gate 40 in which the shift mode is changed between the P, R, N and D ranges, a second gate 42 in which the shift mode is changed between the 3, 2 and L ranges, and a third gate 43 interconnecting the first and second gates 40 and 42, and in which the shift mode is changed from the D range to the third speed 3 range.

Figure 4A:
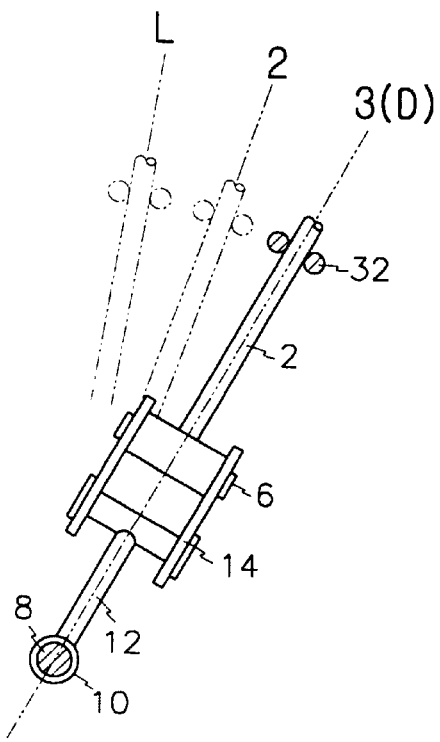
FIGS. 4A and 4B are schematic diagrams illustrating a shift motion between 3, 2, and L ranges of a shift lever system according to a preferred embodiment of the present invention.
Figure 4B:
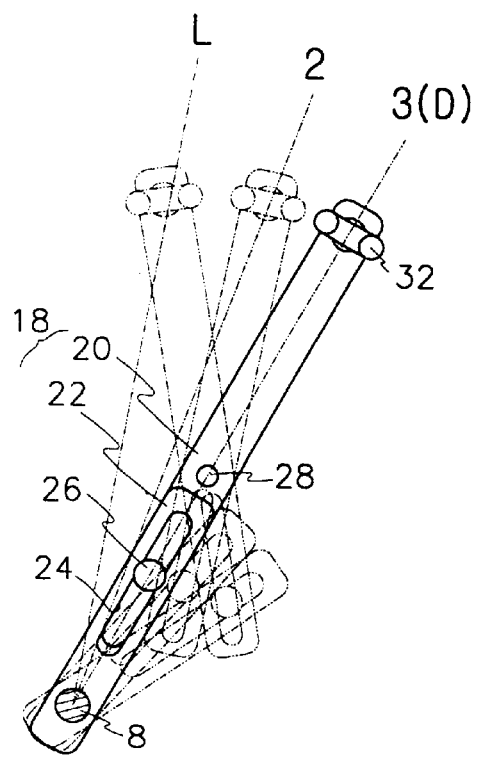

Describing more in detail, when the shift lever 2 is pivoted into the branch portion of the first connecting member 30 as shown in FIG. 3, the shift lever 2 is located in the first gate 40. In this state, when the user pulls the shift lever 2 rearward, the shift cable 34 cooperates with the movement of the shift lever 2 to change the shift mode. As the shift lever 2 moves from the P range to the D range, the angle between the first support 16 and the upper member 20 of the second supports is reduced, and finally becomes zero at the D range as shown in FIG. 4B.

When shifting the shift mode from the D range to the 3 range, the shift lever 2 is moved from the first gate 40 to the second gate 42 through the third gate 43. At this point, the shift lever 2 is moved into the branch portion of the second connecting member 32, and the shift lever 2 contacts the third speed On/Off switch 36 which is disposed on an inlet side of the second gate 42, thereby completing the shift operation to the third speed range. During this operation, the shift lever 2 rotates about the first hinge pin 6 in the lateral direction of the vehicle body. In a state where the shift lever 2 is positioned into the second gate 42, the shifting operation to the 2 and L ranges are realized by moving the shift lever 2 forward.

Figure 5:
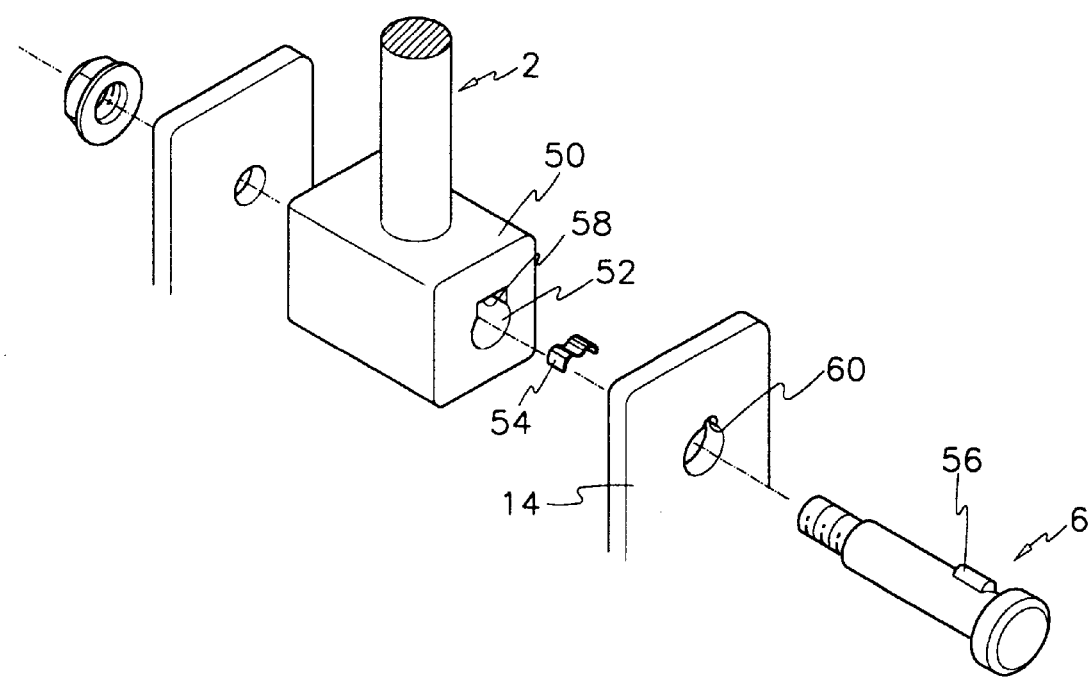
FIG. 5 is an exploded perspective view illustrating a detent mechanism of a shift lever system according to a preferred embodiment of the present invention.
Figure 6:
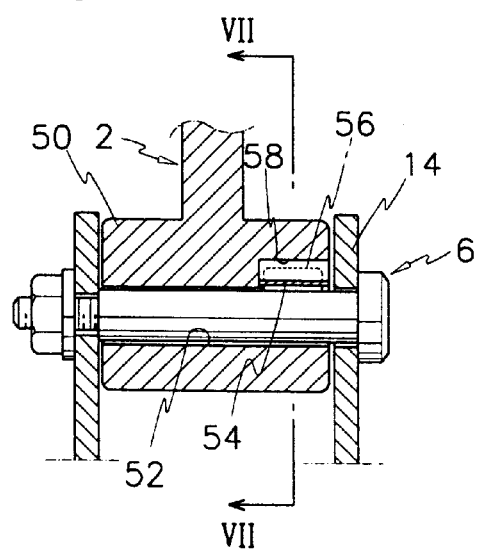
FIG. 6 is a sectional view of a shift lever system depicted in FIG. 5 when it is assembled.
Figure 7:
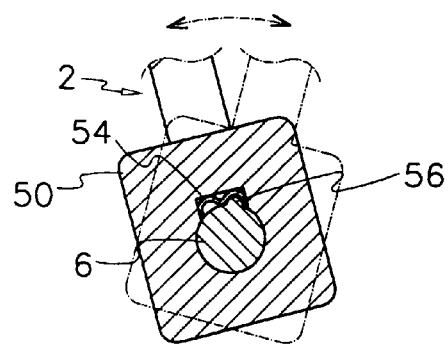
FIG. 7 is a sectional view taken along line VII—VII FIG. 6.
Figure 8:
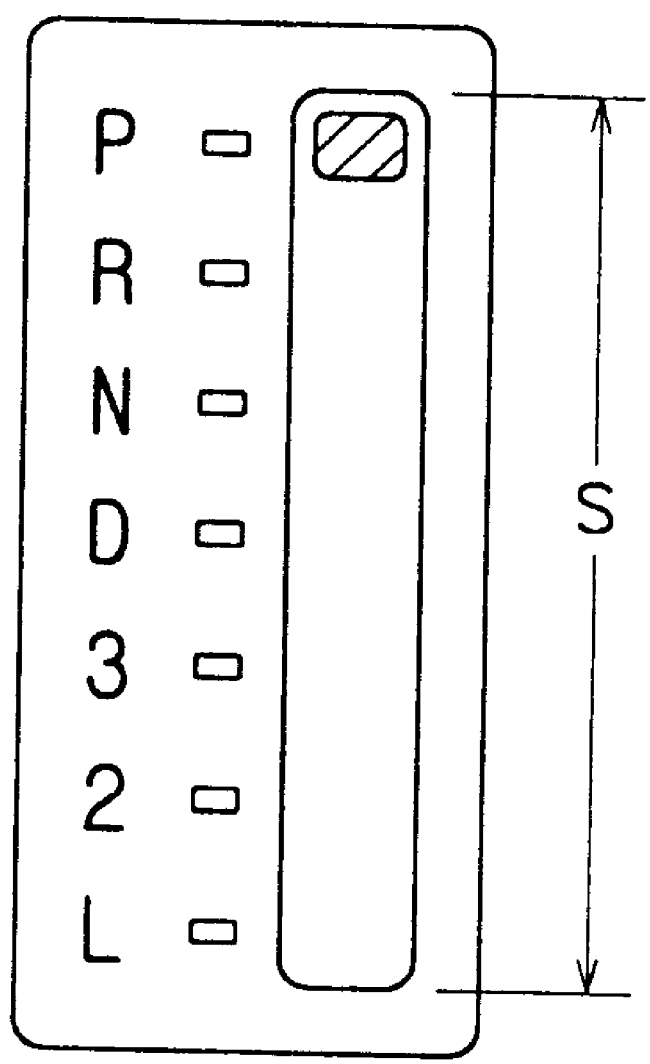
FIG. 8 is a plane view of a range indicating panel for illustrating an operation pattern of a conventional shift lever system.

FIGS. 5 to 7 shows a select lever system where a detent member according to a preferred embodiment of the present invention is employed.

A wave-shaped detent plate 54 is inserted into a hinge hole 52 formed on a lower body 50 of the shift lever 2. A detent projection 56 is formed on a central portion of the first hinge pin 6. An insertion groove 58 is formed on a wall of the hinge hole 52 to accommodate the detent plate 54. In addition, a guide groove 60 is formed on the support 14 of the first rotating member 4 so that the detent projection 56 is inserted together with the first hinge pin 6.

Accordingly, when shifting the shift lever 2 between the first and second gates 40 and 42, the driver can feel the shifting operation and the shift lever 2 is securely supported as the detent projection 56 is biased by the detent plate 54.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A shift lever system for a vehicle having longitudinal and lateral directions, the shift lever system comprising:

a shift lever pivotable in the longitudinal and lateral directions;

a main range shift part for a shift operation between parking P, reverse R, neutral N, and drive D ranges in accordance with a movement of the shift lever along a first line between a first point and a second point, the first line being generally parallel to the longitudinal direction, wherein the main range shift part comprises a first support rotatably supported at a main hinge pin, and a connecting member coupled to the first support and selectively coupled to the shift lever and coupled to a shift cable;

a forward manual shift part for a shift operation between third 3, second 2, and lockup L ranges in accordance with a movement of the shift lever along a second line between a third point and a fourth point, the second line being generally parallel to the first line and the first and third points being located on a third line lateral to the longitudinal direction, and the second and fourth points being spaced away from the third line in the same longitudinal direction; and a D-3/3-D range shift part for a shift operation between the D and 3 ranges in accordance with a movement of the shift lever along the third line connecting the first point to the third point.

2. The shift lever system of claim 1 wherein the shift lever is pivotally coupled at its lower end to an upper end of a first rotating member by a first hinge pin which is disposed in the longitudinal direction, and a lower end of the first rotating member is pivotally coupled around the main hinge pin disposed in the lateral direction.

3. The shift lever system of claim 2 further comprising a detent member disposed between the shift lever and the first hinge pin.

4. The shift lever system of claim 1 wherein the forward manual range shift part comprises a second support supported at the main hinge pin and a connecting member selectively coupled to the shift lever.

5. The shift lever system of claim 4 wherein the second support comprises a lower member fixed on the main hinge pin, and an upper member pivotally coupled to the lower member by a hinge pin.

6. The shift lever system of claim 1 wherein the D-3/3-D range shift part comprises a third speed On/Off switch electronically coupled to the transmission control unit, the third speed On/Off switch being turned on when the shift lever is moved from the D range to the 3 range by being contacted with the shift lever.

7. A shift lever system for a vehicle having longitudinal and lateral directions, the shift lever system comprising:

a shift lever pivotable in the longitudinal and lateral directions, wherein the shift lever is pivotally coupled at its lower end to an upper end of a first rotating member by a first hinge pin which is disposed in the longitudinal direction, and a lower end of the first rotating member is pivotally coupled around a main hinge pin disposed in the lateral direction, wherein the first rotating member comprises a pair of supporting plates, a post fixed between the supporting plates and extending downward, and a hinge tube fixed on a lower end of the post to rotatably receive the main hinge pin, the shift lever being disposed between the supporting plates by the first hinge pin above the post;

a main range shift part for a shift operation between parking P, reverse R, neutral N, and drive D ranges in accordance with a movement of the shift lever along a first line between a first point and a second point, the first line being generally parallel to the longitudinal direction;

a forward manual shift part for a shift operation between third 3, second 2, and lockup L ranges in accordance with a movement of the shift lever along a second line between a third point and a fourth point, the second line being generally parallel to the first line and the first and third points being located on a third line lateral to the longitudinal direction, and the second and fourth points being spaced away from the third line in the same longitudinal direction; and a D-3/3-D range shift part for a shift operation between the D and 3 ranges in accordance with a movement of the shift lever along the third line connecting the first point to the third point.

8. A shift lever system for a vehicle having longitudinal and lateral directions, the shift lever system comprising:

a shift lever pivotable in the longitudinal and lateral directions, wherein the shift lever is pivotally coupled at its lower end to an upper end of a first rotating member by a first hinge pin which is disposed in the longitudinal direction, and a lower end of the first rotating member is pivotally coupled around a main hinge pin disposed in the lateral direction;

a main range shift part for a shift operation between parking P, reverse R, neutral N, and drive D ranges in accordance with a movement of the shift lever along a first line between a first point and a second point, the first line being generally parallel the longitudinal direction, wherein the main range shift part comprises a first support rotatably supported at the main hinge pin, and a connecting member selectively coupled to the shift lever and coupled to a shift cable;

a forward manual shift part for a shift operation between third 3, second 2, and Iockup L ranges in accordance with a movement of the shift lever along a second line between a third point and a fourth point, the second line being generally parallel to the first line and the first and third points being located on a third line lateral to the longitudinal direction, and the second and fourth points being spaced away from the third line in the same longitudinal direction; and a D-3/3-D range shift part for a shift operation between the D and 3 ranges in accordance with a movement of the shift lever along the third line connecting the first point to the third point.

9. The shift lever system of claim 8 wherein the forward manual range shift part comprises a second support supported at the main hinge pin and a connecting member selectively coupled to the shift lever.

10. The shift lever system of claim 9 wherein the second support comprises a lower member fixed on the main hinge pin, and an upper member pivotally coupled to the lower member by a hinge pin.

11. The shift lever system of claim 10 wherein the D-3/3-D range shift part comprises a third speed On/Off switch electronically coupled to the transmission control unit, the third speed On/Off switch being turned on when the shift lever is moved from the D range to the 3 range by being contacted with the shift lever.

12. A shift lever system for a vehicle having longitudinal and lateral directions, the shift lever system comprising:
- a shift lever pivotable in the longitudinal and lateral directions, wherein the shift lever is pivotally coupled at its lower end to an upper end of a first rotating member by a first hinge pin which is disposed in the longitudinal direction, and a lower end of the first rotating member is pivotally coupled around a main hinge pin disposed in the lateral direction;
- a detent member disposed between the shift lever and the first hinge pin, wherein the detent member comprises a wave-shaped detent plate inserted into a hinge hole formed on a lower body of the shift lever and a detent projection formed on a central portion of the first hinge pin;
- a main range shift part for a shift operation between parking P, reverse R, neutral N, and drive D ranges in accordance with a movement of the shift lever along a first line between a first point and a second point, the first line being generally parallel to the longitudinal direction;
- a forward manual shift part for a shift operation between third 3, second 2, and lockup L ranges in accordance with a movement of the shift lever along a second line between a third point and a fourth point, the second line being generally parallel to the first line and the first and third points being located on a third line lateral to the longitudinal direction, and the second and fourth points being spaced away from the third line in the same longitudinal direction; and
- a D-3/3-D range shift part for a shift operation between the D and 3 ranges in accordance with a movement of the shift lever along the third line connecting the first point to the third point.

13. The shift lever system of claim 12 wherein an insertion groove is formed on a wall of the hinge hole to accommodate the detent plate, and a guide groove is formed on the support of the first rotating member so that the detent projection is inserted together with the first hinge pin.

14. A shift lever system for a vehicle having longitudinal and lateral directions, the shift lever system comprising:
- a shift lever pivotable in the longitudinal and lateral directions;
- a main range shift part for a shift operation between a first set of driving ranges in accordance with a movement of the shift lever along a first direction between a first point and a second point, the first direction being generally along the longitudinal direction, wherein the main range shift part comprises a first support rotatably supported at a first hinge pin and selectively coupled to the shift lever and coupled to a vehicle transmission;
- a second shift part for a shift operation between a second set of driving ranges in accordance with a movement of the shift lever along a direction between a third point and a fourth point, the second direction being generally parallel to the first direction and the first and third points being located along a third direction lateral to the longitudinal direction; and
- a third shift part for a shift operation between the two sets of driving ranges in accordance with a movement of the shift lever along the third direction connecting the first point to the third point.

15. The shift lever system of claim 14 wherein the shift lever is pivotally coupled at its lower end to an upper end of a first rotating member by a second hinge pin which is disposed in the longitudinal direction, and a lower end of the first rotating member is pivotally coupled around the first hinge pin disposed in the lateral direction.

16. The shift lever system of claim 14 wherein the second shift part comprises a second support supported at the first hinge pin and a connecting member selectively coupled to the shift lever.

17. The shift lever system of claim 16 wherein the second support comprises a lower member fixed on the first hinge pin, and an upper member pivotally coupled to the lower member by a hinge pin.

18. The shift lever system of claim 14 wherein the third shift part comprises a third speed On/Off switch electronically coupled to the transmission control unit, the third speed On/Off switch being turned on when the shift lever is moved from the first set to the second set of driving ranges by being contacted with the shift lever.

* * * * *

UNITED STATES PATENT AND TRADEMARK OFFICE
CERTIFICATE OF CORRECTION

PATENT NO. : 6,272,944 B1
DATED : August 14, 2001
INVENTOR(S) : Won-Jin Jeong

It is certified that error appears in the above-identified patent and that said Letters Patent is hereby corrected as shown below:

Column 6,
Line 36, after "parallel" insert -- to --.
Line 42, replace "Iockup" with -- lockup --.

Signed and Sealed this

Twenty-eighth Day of January, 2003

JAMES E. ROGAN
*Director of the United States Patent and Trademark Office*